(12) United States Patent
Zegelin

(10) Patent No.: US 6,847,654 B2
(45) Date of Patent: Jan. 25, 2005

(54) WIRELESS DEVICE WHICH USES AN UPPER MAC AND LOWER MAC INTERFACE

(75) Inventor: Chris Zegelin, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 795 days.

(21) Appl. No.: 09/802,183

(22) Filed: Mar. 8, 2001

(65) Prior Publication Data

US 2002/0080818 A1 Jun. 27, 2002

Related U.S. Application Data

(60) Provisional application No. 60/246,223, filed on Nov. 6, 2000.

(51) Int. Cl.[7] .............................................. H04L 12/66
(52) U.S. Cl. ...................................... 370/463; 370/338
(58) Field of Search ................................ 370/310, 338, 370/419, 431, 463, 469–76, 466, 480

(56) References Cited

U.S. PATENT DOCUMENTS 6,592,032 B1 * 7/2003 Takaragi et al. ............. 235/382
2002/0136203 A1 * 9/2002 Liva et al. ................... 370/352

* cited by examiner

Primary Examiner—David Vincent
(74) Attorney, Agent, or Firm—Williams, Morgan & Amerson, P.C.

(57) ABSTRACT

The division of the 802.11 MAC operation into a lower MAC and an upper MAC is described. The lower MAC functionality is provided by a combination of software commands and an RF driver. The RF driver is intended to be appliance independent and will not change based on what type of 802.11 node is being implemented: Mobile Unit (MU), Access Point (AP), Wireless AP (WLAP), phone, pager, etc. The RF driver is not hardware platform independent, due to variations in DMA capability and allotted timers. The upper MAC is intended to be hardware platform independent, but appliance dependent (i.e. it will change based on the product being implemented such as PCMCIA, USB, PCI, etc.).

7 Claims, 2 Drawing Sheets

WIRELESS DEVICE WHICH USES AN UPPER MAC AND LOWER MAC INTERFACE

REFERENCE TO RELATED APPLICATIONS

This application claims the benefit of provisional application of U.S. Ser. No. 60/246,223 filed Nov. 6, 2000.

BACKGROUND

The International Standards Organization's (ISO's) Open Systems Interconnection (OSI) is an industry standard for communications and networking for open systems. Each of the seven layers specifies particular network functions:

Layer 7, the application layer, the highest layer of the model, defines the way applications interact with the network.

Layer 6, the presentation layer, includes protocols that are part of the operating system, and defines how information is formatted for display or printing and how data is encrypted, and translation of other character sets.

Layer 5, the session layer, coordinates communication between systems, maintaining sessions for as long as needed and performing security, logging, and administrative functions.

Layer 4, the transport layer, controls the movement of data between systems, defines protocols for structuring messages, and supervises the validity of transmissions by performing error checking.

Layer 3, the network layer, defines protocols for routing data by opening and maintaining a path on the network between systems to ensure that data arrives at the correct destination node.

Layer 2, the data-link layer, defines the rules for sending and receiving information from one node to another between systems.

Layer 1, the physical layer, governs hardware connections and byte-stream encoding for transmission. It is the only layer that involves a physical transfer of information between network nodes.

The lower two layers of the OSI model govern the physical link between systems. The main task of the data link layer is to take a raw transmission facility and transform it into a line that appears free of transmission errors in the network layer. It accomplishes this task by having the sender break the input data up into data frames (typically a few hundred bytes), transmit the frames sequentially, and process the acknowledgment frames sent back by the receiver. Since the physical layer merely accepts and transmits a stream of bits without any regard to meaning of structure, it is up to the data link layer to create and recognize frame boundaries. This can be accomplished by attaching special bit patterns to the beginning and end of the frame. If there is a chance that these bit patterns might occur in the data, special care must be taken to avoid confusion.

The final step in transmitting a message over the network is actually sending the message (and all the associated headers) over the physical connection. The binary data is transmitted using several methods: analog signals, amplitude or frequency modulation, light signals, radio signals or electromagnetic signals. The physical later is concerned with transmitting raw bits over a communication channel. The design issues have to do with making sure that when one side sends a 1 bit, it is received by the other side as a 1 bit, not as a 0 bit. Typical questions here are how many volts should be used to represent a 1 and how many for a 0, how many microseconds a bit lasts, whether transmission may proceed simultaneously in both directions, how the initial connection is established and how it is torn down when both sides are finished, and how many pins the network connector has and what each pin is used for. The design issues here deal largely with mechanical, electrical, and procedural interfaces, and the physical transmission medium, which lies below the physical layer.

The IEEE 802 committee has established the standards that have driven the LAN industry for the past two decades, including 802.3 Ethernet, 802.5 Token Ring, and 802.3z 100BASE-T Fast Ethernet. In 1997, after seven years of work, the IEEE published 802.11, the first internationally sanctioned standard for wireless LANs. In September 1999 the IEEE ratified the 802.11b "High Rate" amendment to the standard, which added two higher speeds (5.5 and 11 Mbps) to 802.11. The 802.11b specification affects only the physical layer, adding higher data rates and more robust connectivity. The standards-based technology allows administrators to build networks that seamlessly combine more than one LAN technology to best fit their business and user needs.

Like all IEEE 802 standards, the 802.11 standards focus on the bottom two levels of the ISO model, the physical layer and data link layer. The data link layer within 802.11 consists of two sublayers: Logical Link Control (LLC) and Media Access Control (MAC). 802.11 uses the same 802.2 LLC and 48-bit addressing as other 802 LANs, allowing for very simple bridging from wireless to IEEE wired networks. The MAC, however, is unique to wireless local area networks (WLANs). The 802.11 MAC is very similar in concept to 802.3, in that it is designed to support multiple users on a shared medium by having the sender sense the medium before accessing it. For 802.3 Ethernet LANs, the Carrier Sense Multiple Access with Collision Detection (CSMA/CD) protocol regulates how Ethernet stations establish access to the wire and how they detect and handle collisions that occur when two or more devices try to simultaneously communicate over the LAN. In an 802.11 WLAN, collision detection is not possible due to what is known as the "near/far" problem: to detect a collision, a station must be able to transmit and listen at the same time, but in radio systems the transmission drowns out the ability of the station to "hear" a collision. To account for this difference, 802.11 uses a slightly modified protocol known as Carrier Sense Multiple Access with Collision Avoidance (CSMA/CA) or the Distributed Coordination Function (DCF). CSMA/CA attempts to avoid collisions by using explicit packet acknowledgment (ACK), which means an ACK packet is sent by the receiving station to confirm that the data packet arrived intact.

CSMA/CA works as follows. A station wishing to transmit senses the air, and, if no activity is detected, the station waits an additional, randomly selected period of time and then transmits if the medium is still free. If the packet is received intact, the receiving station issues an ACK frame that, once successfully received by the sender, completes the process. If the ACK frame is not detected by the sending station, either because the original data packet was not received intact or the ACK was not received intact, a collision is assumed to have occurred and the data packet is transmitted again after waiting another random amount of time. CSMA/CA thus provides a way of sharing access over the air. This explicit ACK mechanism also handles interference and other radio-related problems very effectively.

The MAC layer is designed to interface with many different types of devices used in a WLAN, including access points, mobile units and client bridges. Such WLAN devices have differing characteristics. There is therefore a need in the art for a mechanism for an improved apparatus and method for the MAC layer to operate based on the characteristics of the device that is connected to the MAC layer.

SUMMARY

The present invention is based on the division of the 802.11 MAC operation into two entities: a lower MAC and an upper MAC. The lower MAC functionality will be provided by a combination of software commands and an RF driver. The RF driver is intended to be appliance independent. In other words, the RF driver will not change based on what type of 802.11 node is being implemented: Mobile Unit (MU), Access Point (AP), Wireless AP (WLAP), phone, pager, etc. The RF driver will not be hardware platform independent, due to variations in DMA capability and allotted timers. The upper MAC is intended to be hardware platform independent, but appliance dependent (i.e. it will change based on the product being implemented such as PCMCIA, USB, PCI, etc.).

DETAILED DESCRIPTION

Figure 1:
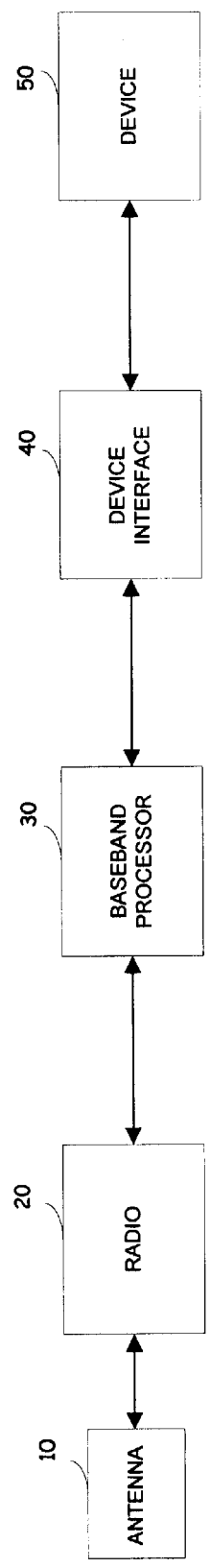
FIG. 1 illustrates a basic block diagram of a radio frequency transceiver.

Turning to FIG. 1, shown is a basic conceptual overview of a transceiver that may be used in a wireless local area network (WLAN) device. Shown is an antenna 10 that is capable of receiving and transmitting radio frequency signals. Once signals are received by antenna 10, these signals are passed on to the radio 20 for converting from the higher radio frequency to the analog baseband signal. The analog baseband signal is passed on the baseband processor 30, where the baseband analog signal is converted to a digital signal and processed to extract the data transmitted over the radio frequency signal. This signal is passed on to the device interface 40, where the information contained within the signal is processed to determine the actions necessary to pass on to the device 50. Such devices may be, for example, an access point, mobile terminal, network interface card or client bridge. The process may be reversed to send radio frequency signals through the antenna 10. In one embodiment of FIG. 1, each of the radio 20, baseband processor 30 and device interface 40 are fabricated on a separate ASIC.

Applying the 802.11 protocol, the radio 20 and baseband processor 30 performed much of the PHY functionality and the device interface 40 performed much of the MAC functionality. While the nature of the MAC functions coordinated by device interface 40 differ based on the nature of the device 50 that is connected to the transceiver, many MAC functions that have traditionally been performed by device interface 40 are independent of the nature of the device 50. When all the MAC functions are on the device interface 40, however, this results in needless duplication of the hardware and software to perform MAC functions that are common to each device 50.

This process can be made more efficient by division of the 802.11 MAC operation into two entities: a lower MAC and an upper MAC. The lower MAC functionality may be provided by a combination of software commands and an RF driver. The RF driver is intended to be appliance independent. In other words, the RF driver will not change based on what type of 802.11 node is being implemented: Mobile Unit (MU), Access Point (AP), Wireless AP (WLAP), phone, pager, etc. In contrast, the upper MAC is intended to be hardware platform independent, but appliance dependent (i.e. it will change based on the product being implemented).

This design presents the advantage that for each product used on a WLAN, only the hardware and software necessary to run the upper MAC must be designed and configured for that product. The lower MAC will remain the same and will not require new design to implement the necessary hardware and software.

Figure 2:
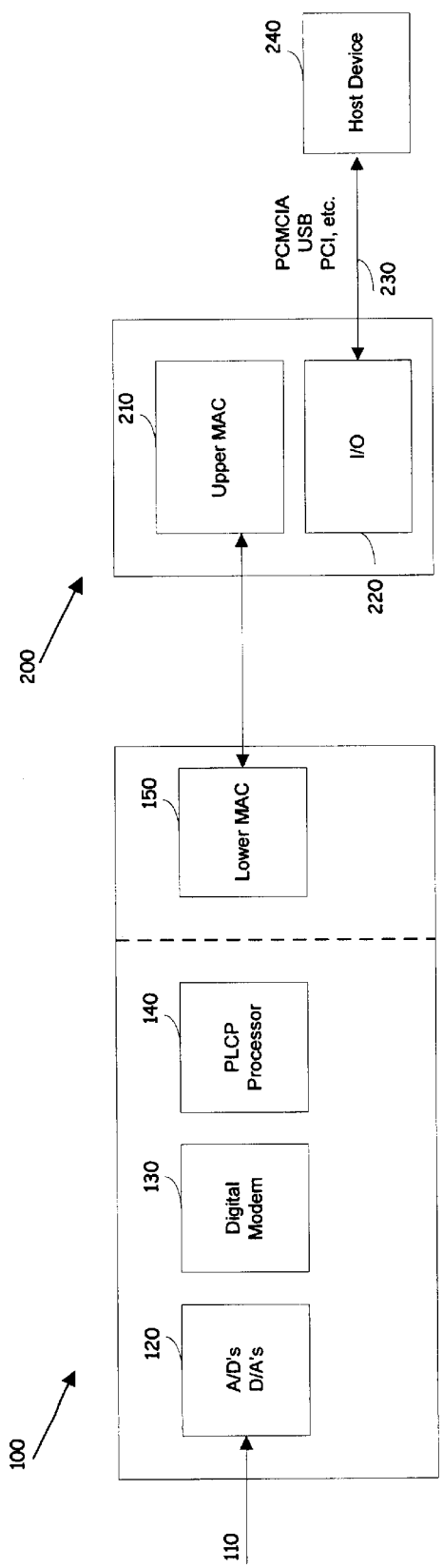
FIG. 2 illustrates a basic block diagram of an improved radio frequency transceiver with the lower MAC and upper MAC split over two chipsets.

FIG. 2 illustrates an embodiment of the present invention incorporating the concept described above. Shown is a baseband processor 100 chipset along with a device interface chipset 200. For receiving data, the baseband processor 100 includes a mechanism 110 to receive signals converted from the higher radio frequency radio signal to the analog baseband signal. These signals are then processed by analog to digital converters 120, a digital modem 130 and the PLCP (physical layer convergence procedure) processor 140. The PLCP processor 140 is a PHY sublayer designed to work with the MAC by minimizing the variations in the PHY layer necessitated by the variations of the physical media. The baseband processor 100 also includes the lower MAC 150.

The device interface chipset 200 includes the upper MAC 210 and the I/O interface 220 which is designed to communicate 230 with a host device 240 based on various protocols such as PCMCIA, USB and PCI.

The hardware and software necessary to implement the upper MAC 210 will reside on the device interface chipset 200 while the hardware and software necessary to implement the lower MAC 150 will reside on the baseband processor 100. Although the upper MAC 210 implementation will vary based on the product it interfaces with, the general features of the device interface chipset may include one or more of the following:

PC Card Host Interface
CardBus Host Interface
CIS Logic and RAM
Arbitration plus Interleaver
Internal RAM
Local Bus Interface
Reset logic
Power Down Control
ARC processor core
Internal control registers
Interrupt Controller
Timers
WEP engine
DMA Controllers The lower MAC 150 is designed to interface with the baseband processor on the one hand and the upper MAC 210 on the other. Specifically, the interface must be able to keep up with the data flow from the baseband processor, both for transmit and receive. Such a data flow may currently be as fast as 11 megabits per second and is expected to be as a high as 100 megabits per, second in the near future. The enabling of WEP (for encrypting and decrypting) may be activated so as not to adversely affect throughput.

With respect to the interface with the upper MAC 210, the lower MAC 150 is designed so that its implementation does not vary based on whatever device will ultimately receive the signals sent via the RF medium. In order for such an interface to work properly, certain information regarding the nature of the host device 240 (and the upper MAC 210, which is host device 240 dependent) must be incorporated into the process of the lower MAC 150. Such incorporation may occur, for example, by software or hardware.

In particular, various types of information may be stored in registered included in the lower MAC 150 to accomplish the necessary interface with the upper MAC 210. To provide for the possibility that problems that can occur when the host device 240 is operating, the lower MAC 150 may operate completely asynchronously to the interface with the upper MAC 210 by providing all of the registers with double synchronizing flip flops on all the communication signals and data latches. The interface may be designed to work with processors that have bus speeds of up to 100 Mhz while being completely static for very slow access requirements.

In a further example, the lower MAC 150 may include one or more hardware configuration registers to represent the bus size of the host device 240. In one embodiment, the size of the bus of the host, which may be, for example, an 8, 16, or 32 bit bus is softloaded into a register located in the lower MAC 150. This may be accomplished via software (preferred embodiment) or via hardware using external pins. The register may consist of two double synchronizing flip flops that can be set to indicate the width of the bus of the host device 240 in accordance with the following table:

00-Not Valid
01-8 bits
10-16 bits
11-32 bits

In a further embodiment, this hardware configuration register may be configured prior to setting a "System Enable" control bit and it is never modified while the system is enabled. Because setting this register involves a test modes that have special functions and require an intimate knowledge of the internal logic to use them effectively, they are not be used during normal operation. Accordingly, this register may be written twice with the same data value in order for the configuration to take effect.

In a further embodiment, the functionality of the hardware configuration registers may be accomplished instead by software running within the lower MAC 150.

These configurations may be set to work with optional features of the MAC layer in the 802.11 protocol. One MAC-layer problem specific to wireless is the "hidden node" issue, in which two stations on opposite sides of an access point can both "hear" activity from an access point, but not from each other, usually due to distance or an obstruction. To solve this problem, 802.11 specifies an optional Request to Send/Clear to Send (RTS/CTS) protocol at the MAC layer. When this feature is in use, a sending station transmits an RTS and waits for the access point to reply with a CTS. Since all stations in the network can hear the access point, the CTS causes them to delay any intended transmissions, allowing the sending station to transmit and receive a packet acknowledgment without any chance of collision. Since RTS/CTS adds additional overhead to the network by temporarily reserving the medium, it is typically used only on the largest-sized packets, for which retransmission would be expensive from a bandwidth standpoint.

The 802.11 MAC layer provides for two other robustness features: CRC checksum and packet fragmentation. Each packet has a CRC checksum calculated and attached to ensure that the data was not corrupted in transit. This is different from Ethernet, where higher-level protocols such as TCP handle error checking. Packet fragmentation allows large packets to be broken into smaller units when sent over the air, which is useful in very congested environments or when interference is a factor, since larger packets have a better chance of being corrupted. This technique reduces the need for retransmission in many cases and thus improves overall wireless network performance. The MAC layer is responsible for reassembling fragments received, rendering the process transparent to higher-level protocols.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A system for processing radio frequency signals, comprising:

a transceiver for the reception and transmission of radio frequency signals;

a frequency converter for converting the radio frequency signals into an analog baseband signal, the analog baseband signal having a frequency less than the frequency of the radio frequency signal;

a baseband processor for converting the analog baseband signal into a corresponding digital signal;

a host device;

a first media access interface having a first media access architecture for processing the digital signal to provide information to the host device;

a second media access interface having a second media access architecture for processing the digital signal to provide information to the host device;

wherein the first media access architecture is primarily independent from the host device; and wherein the second media access architecture is primarily dependent on the host device.

2. The system of claim 1 wherein the first media access interface and the frequency converter are housed on a first chipset; and wherein the second media access interface is housed on a second chipset.

3. The system of claim 1 wherein the first media access interface, the frequency converter, and the transceiver are housed a first chipset; and wherein the second media access interface is housed on a second chipset.

4. The system as in claim 2, wherein the first media access architecture comprises a data store having host device data corresponding to the properties of host device.

5. The system as in claim 4, wherein the host device data represents the bus size of the host device.

6. The system as in claim 5, wherein the data store comprises a plurality of double synchronizing flip flops capable of operating asynchrously with the first media access interface.

7. The system as in claim 5, wherein the data store is implemented using software.

* * * * *